US010830562B2

(12) United States Patent
Himmelmann

(10) Patent No.: US 10,830,562 B2
(45) Date of Patent: Nov. 10, 2020

(54) WEARABLE POWER MODULES WITH DISTRIBUTED ENERGY STORAGE SYSTEMS

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/383,626

(22) Filed: Apr. 14, 2019

(65) Prior Publication Data

US 2020/0326158 A1 Oct. 15, 2020

(51) Int. Cl.
| F41H 1/02 | (2006.01) |
| H02J 3/36 | (2006.01) |
| F02C 6/04 | (2006.01) |
| F01D 15/10 | (2006.01) |
| F02C 9/28 | (2006.01) |
| F41H 5/08 | (2006.01) |

(52) U.S. Cl.
CPC ............... *F41H 1/02* (2013.01); *F01D 15/10* (2013.01); *F02C 6/04* (2013.01); *F02C 9/28* (2013.01); *F41H 5/08* (2013.01); *H02J 3/36* (2013.01)

(58) Field of Classification Search
CPC .. B25J 19/005; B25J 9/0006; A61F 2002/708; A61F 2005/0155; A45F 3/10; A61H 3/00–068
USPC .............................. 60/698; 224/576; 280/1.5
See application file for complete search history.

(56) References Cited

U.S. PATENT DOCUMENTS

| 3,023,980 | A | * | 3/1962 | Martin | .................... F02C 3/085 244/4 A |
| 3,063,663 | A | * | 11/1962 | Rickards | ............... B64C 39/026 244/169 |
| 3,270,986 | A | * | 9/1966 | Johnson | ................... B64G 4/00 244/4 A |
| 3,381,917 | A | * | 5/1968 | Moore | .................. B64C 39/026 244/4 A |
| 3,416,753 | A | * | 12/1968 | Hulbert | ............... B64C 29/0091 244/4 A |
| RE26,756 | E | * | 1/1970 | Moore et al. | ......... B64C 39/026 244/4 R |

(Continued)

FOREIGN PATENT DOCUMENTS

CN   102556348 A   7/2012

OTHER PUBLICATIONS

European Search Report for Application No. 19215245.2, dated Jul. 3, 2020, 58 pages.

*Primary Examiner* — Mark A Laurenzi
*Assistant Examiner* — Mickey H France
(74) *Attorney, Agent, or Firm* — Cantor Colburn LLP

(57) ABSTRACT

An energy storage system for a wearable power module includes a harness with a torso segment and a limb segment, a turboalternator supported by the torso segment of the harness, and a chemical energy source. The chemical energy source in fluid communication with the turboalternator and is supported by the limb segment of the harness in a distributed arrangement to allow for support of a mechanical load by the torso segment of the harness. Wearable power modules and exoskeletons are also described.

20 Claims, 5 Drawing Sheets

(56) References Cited

U.S. PATENT DOCUMENTS

| | | | | |
|---|---|---|---|---|
| 3,556,438 | A * | 1/1971 | Meditz | B64C 39/026 244/4 A |
| 4,281,418 | A * | 8/1981 | Cieslak | A43B 7/02 126/206 |
| 6,062,244 | A * | 5/2000 | Arkans | A61H 9/0078 137/1 |
| 6,257,875 | B1 * | 7/2001 | Johnstone | A01M 15/00 126/271.2 R |
| 6,574,950 | B2 | 6/2003 | Nash | |
| 6,666,796 | B1 * | 12/2003 | MacCready, Jr. | A61F 5/0102 135/65 |
| 6,938,588 | B2 * | 9/2005 | Jacobsen | F01B 11/00 123/305 |
| 6,959,549 | B2 * | 11/2005 | Tilston | F01K 13/00 60/651 |
| 6,969,027 | B2 * | 11/2005 | Ishiba | B64C 27/20 244/12.2 |
| 6,982,497 | B2 * | 1/2006 | Rome | A45F 3/08 224/579 |
| 7,047,722 | B2 * | 5/2006 | Filippone | F02G 1/04 60/200.1 |
| 7,299,616 | B2 | 11/2007 | Filippone | |
| 7,391,123 | B2 * | 6/2008 | Rome | A45F 3/08 224/604 |
| 8,636,247 | B2 | 1/2014 | Danforth et al. | |
| 9,362,803 | B2 * | 6/2016 | Panousis | H02K 7/1853 |
| 9,407,125 | B2 * | 8/2016 | Shepertycky | H02K 7/1861 |
| 10,112,713 | B2 * | 10/2018 | Tyler | B64C 39/026 |
| 2003/0066291 | A1 * | 4/2003 | Filippone | F15B 15/18 60/698 |
| 2004/0065086 | A1 * | 4/2004 | Filippone | F02G 1/04 60/698 |
| 2004/0183306 | A1 * | 9/2004 | Rome | A45F 3/08 290/1 R |
| 2006/0107663 | A1 * | 5/2006 | Filippone | F02G 1/04 60/643 |
| 2006/0192386 | A1 * | 8/2006 | Rome | A45F 3/08 290/1 R |
| 2006/0196215 | A1 * | 9/2006 | Crumlin | A45F 3/10 62/371 |
| 2007/0290097 | A1 * | 12/2007 | Ishiba | B64C 27/20 244/12.1 |
| 2008/0034730 | A1 * | 2/2008 | Filippone | F02C 6/00 60/39.182 |
| 2009/0020654 | A1 | 1/2009 | Tyler | |
| 2009/0139248 | A1 * | 6/2009 | Crumlin | A45F 3/047 62/62 |
| 2010/0230450 | A1 * | 9/2010 | Tomberli | A45F 3/10 224/261 |
| 2011/0056443 | A1 * | 3/2011 | Schliemann | A01G 20/30 123/2 |
| 2015/0226234 | A1 * | 8/2015 | Amundson | A61H 1/0262 60/327 |
| 2015/0330294 | A1 * | 11/2015 | Golad | F02B 63/048 290/1 A |
| 2017/0015419 | A1 * | 1/2017 | Tyler | B64C 39/026 |
| 2017/0071812 | A1 * | 3/2017 | Sandler | A61G 5/14 |
| 2017/0151577 | A1 * | 6/2017 | Baltz | B05B 5/005 |
| 2017/0202703 | A1 * | 7/2017 | Yazdani | A61F 7/02 |
| 2018/0312257 | A1 | 11/2018 | Near | |
| 2019/0152601 | A1 * | 5/2019 | Tyler | B64D 17/40 |
| 2019/0257245 | A1 * | 8/2019 | Duge | F02C 6/003 |
| 2019/0382114 | A1 * | 12/2019 | Browning | B64C 39/026 |
| 2020/0025082 | A1 * | 1/2020 | Karam | H02K 7/1823 |
| 2020/0069441 | A1 * | 3/2020 | Larose | A61F 2/70 |
| 2020/0102894 | A1 * | 4/2020 | Duge | F02C 7/262 |

* cited by examiner

WEARABLE POWER MODULES WITH DISTRIBUTED ENERGY STORAGE SYSTEMS

BACKGROUND

The present disclosure generally relates to power modules, and more particularly to wearable power modules with distributed energy systems.

Military planners commonly look for ways to provide soldiers with improved protection and mobility, greater firepower, and the ability to carry additional equipment into battle without feeling the effects of fatigue. Various types of electrically powered equipment have been developed with these needs in mind, the power requirements of such equipment generally being accommodated by rechargeable batteries. In some applications the power requirement of the electrically powered equipment can exceed the capability of rechargeable batteries to provide electric power. In such situations it may be necessary to either limit the duration of the operation or tether the equipment to a power source.

Such power sources have generally been acceptable for their intended purpose. However, there remains a need for improved sources of electrical power. The present disclosure provides a solution to this need.

BRIEF DESCRIPTION

An energy storage system for wearable power modules is provided. The energy storage system includes a harness with a torso segment and a limb segment, a turboalternator supported by the torso segment of the harness, and a chemical energy source. The chemical energy source is in fluid communication with the turboalternator and is supported by the harness, the chemical energy source is supported on the limb segment of the harness in a distributed arrangement to allow for support of a mechanical load by the torso segment of the harness.

In addition to one or more of the features described above, or as an alternative, further embodiments may include wherein the limb segment of the harness includes a left-leg portion and a right-leg portion, wherein the chemical energy source is distributed between the left-leg portion and right-leg portion of the limb segment.

In addition to one or more of the features described above, or as an alternative, further embodiments may include wherein the chemical energy source comprises a first pressure vessel and one or more second pressure vessels, the one or more second pressure vessels in fluid communication with the turboalternator.

In addition to one or more of the features described above, or as an alternative, further embodiments may include wherein the first pressure vessel is fluidly connected to the turboalternator by the one or more second pressure vessels.

In addition to one or more of the features described above, or as an alternative, further embodiments may include wherein the first pressure vessel contains a compressed gas charge, wherein the one or more second pressure vessels contain a fuel charge.

In addition to one or more of the features described above, or as an alternative, further embodiments may include wherein the one or more second pressure vessels contain a liquid fuel charge, wherein the liquid fuel charge is pressurized by a compressed gas communicated by the first pressure vessel.

In addition to one or more of the features described above, or as an alternative, further embodiments may include wherein limb segment of the harness comprises a left-leg portion and right-leg portion, wherein the first pressure vessel is supported by one of the left-leg portion and the right-leg portion, wherein the one or more second pressure vessels are is supported by the other of left-leg portion and the right-leg portion.

In addition to one or more of the features described above, or as an alternative, further embodiments may include a turbine speed control valve fluidly connecting the chemical energy source to the turboalternator.

In addition to one or more of the features described above, or as an alternative, further embodiments may include wherein the torso segment of the harness has a shoulder portion and a lower back portion, wherein the turboalternator is supported by the lower back portion of the torso segment, and further comprising a mechanical load supported by the lower back portion of the harness.

In addition to one or more of the features described above, or as an alternative, further embodiments may include an electrical load electrically connected to the turboalternator.

In addition to one or more of the features described above, or as an alternative, further embodiments may include a ballistic shield at least partially enclosing the chemical energy source.

In addition to one or more of the features described above, or as an alternative, further embodiments may include wherein the ballistic shield comprises an outer case, wherein the chemical energy source is arranged between the harness and the outer case of the ballistic shield.

In addition to one or more of the features described above, or as an alternative, further embodiments may include that the ballistic shield includes an inner case arranged between the chemical energy source and the harness, an outer case arranged on a side of the chemical energy source opposite the inner case, and a shear thickening fluid disposed between the inner case and the outer case, the shear thickening fluid enveloping at least a portion of the chemical energy source.

In addition to one or more of the features described above, or as an alternative, further embodiments may include wherein the ballistic shield comprises a fiber reinforced ceramic material.

In addition to one or more of the features described above, or as an alternative, further embodiments may include wherein the chemical energy source comprises a first pressure vessel and one or more second pressure vessels, wherein the ballistic shield encloses the first pressure vessel and the one or more second pressure vessels.

A wearable power module is also provided. The wearable power module includes an energy storage system as described above. The chemical energy source includes a first pressure vessel and one or more second pressure vessels, the one or more second pressure vessels in fluid communication with the turboalternator, wherein the limb segment of the harness includes a left-leg portion and a right-leg portion, wherein the first pressure vessel and the one or more second pressure vessels are distributed between the left-leg portion and right-leg portion of the limb segment; and a ballistic shield at least partially enclosing the first pressure vessel and the one or more second pressure vessels.

In addition to one or more of the features described above, or as an alternative, further embodiments may include that the torso segment of the harness has a shoulder portion and a lower back portion, wherein the turboalternator is supported by the lower back portion of the torso segment, and the wearable power module additionally includes a mechanical load including a cargo pack supported by the lower back portion of the harness, and an electrical load electrically connected to the turboalternator.

An exoskeleton is additionally provided. The exoskeleton includes at least one of a load-carrying member and load-transfer member and an energy storage system as described above. The chemical energy source is supported by the exoskeleton through the harness of the energy storage system.

Technical effects of the present disclosure include wearable power modules with distributed energy storage systems. In certain embodiments the distribution of the energy storage system is such that chemical energy for the wearable power module leaves the shoulder portion of a harness available for a mechanical load, such as a cargo pack. In accordance with certain embodiments a turboalternator is provided to provide electrical power for one of more electrical loads and is distributed such that the shoulder portion of the harness is available for the mechanical load.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
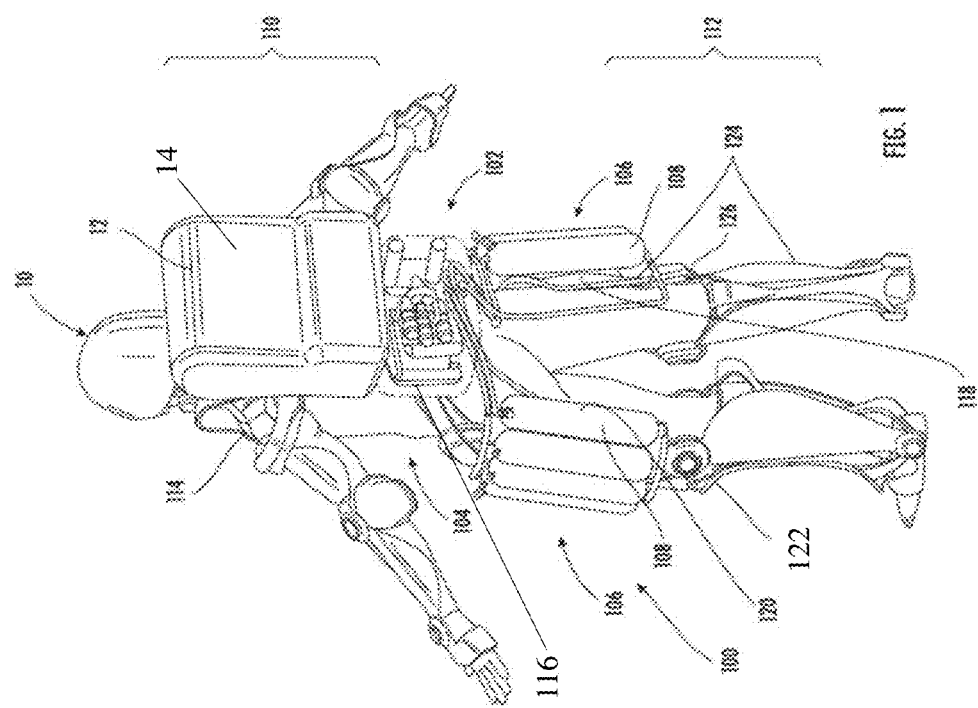
FIG. 1 is a perspective view of a wearable power module constructed in accordance with the present disclosure, showing a distributed energy storage system and a turboalternator supported by a harness.

Reference will now be made to the drawings wherein like reference numerals identify similar structural features or aspects of the subject disclosure. For purposes of explanation and illustration, and not limitation, a partial view of an exemplary embodiment of an energy storage system constructed in accordance with the disclosure is shown in FIG. 1 and is designated generally by reference character 100. Other embodiments of energy storage systems, wearable power modules, and exoskeletons having distributed energy systems in accordance with the present disclosure, or aspects thereof, are provided in FIGS. 2-6, as will be described. The systems and methods described herein can be used for generating electrical power from a wearable power module, such as military applications, though the present disclosure is not limited to military applications or to wearable application in general.

Referring to FIG. 1, the energy storage system 100 is shown. The distributed energy system is configured to provide chemical energy to a turboalternator 102 and includes a harness 104 and a chemical energy source 105 (shown in FIG. 3) with a plurality of fuel pressure vessels 106 and a plurality of compressed gas pressure vessels 108. The harness 104 includes a torso segment 110 and a limb segment 112. The torso segment 110 is configured and adapted to be worn by a user 10, e.g., a soldier, and has a shoulder portion 114 and a lower back portion 116. The shoulder portion 114 is configured to be suspended from the shoulders of the user 10. The lower back portion 116 is configured to be suspended from the lower back of the user 10. As used herein the term fuel encompasses mono-propellants, which can provide a flow of high pressure decomposition products without an oxidizer, and liquid fuels requiring an oxidizer to generate high pressure combustion products.

The limb segment 112 is configured and adapted to be worn by the user 10 and has a right-leg portion 118 and a left-leg portion 120. The right-leg portion 118 is configured to be suspended from the right-leg of the user 10. The left-leg portion 120 is configured to be suspended from the left-leg of the user 10. In certain embodiments the harness 104 can be included in an exoskeleton 122 having a one or more support member elements 124 and one or more load transfer members 126 operably connected to the one or more support members 124 to manipulate loads, e.g., the mechanical load 12, according instructions received from the user 10.

The turboalternator 102 is supported by the torso segment 110 of the harness 104. More specifically, the turboalternator is supported by the lower back portion 116 of the torso segment 110 of the harness 104. The fuel pressure vessels 106 and the compressed gas pressure vessels 108 are supported by the limb segment 112 of the harness 104, and are each distributed on the limb segment of the harness 104. It is contemplated that one or more of the fuel pressure vessels 106 be supported by the right-leg portion 118 of the harness 104 and that one or more of the fuel pressure vessels 106 be supported by the left-leg portion 120 of the harness 104. It is also contemplated that one or more of the compressed gas pressure vessels 108 be supported by the right-leg portion 118 of the harness 104 and one or more of the compressed gas pressure vessels 108 be supported by the left-leg portion 120 of the harness 104. This allows the shoulder portion 114 of the harness 104 to be free such that a mechanical load 12 may be positioned on the shoulder portion 114 of the torso segment 110 of the harness 104. As shown in FIG. 1 the mechanical load 12 includes a cargo pack 14, e.g., a rucksack-type military cargo pack, which is supported by the harness 104 above the turboalternator 102, the fuel pressure vessels 106, and the compressed gas pressure vessels 108.

Figure 2:
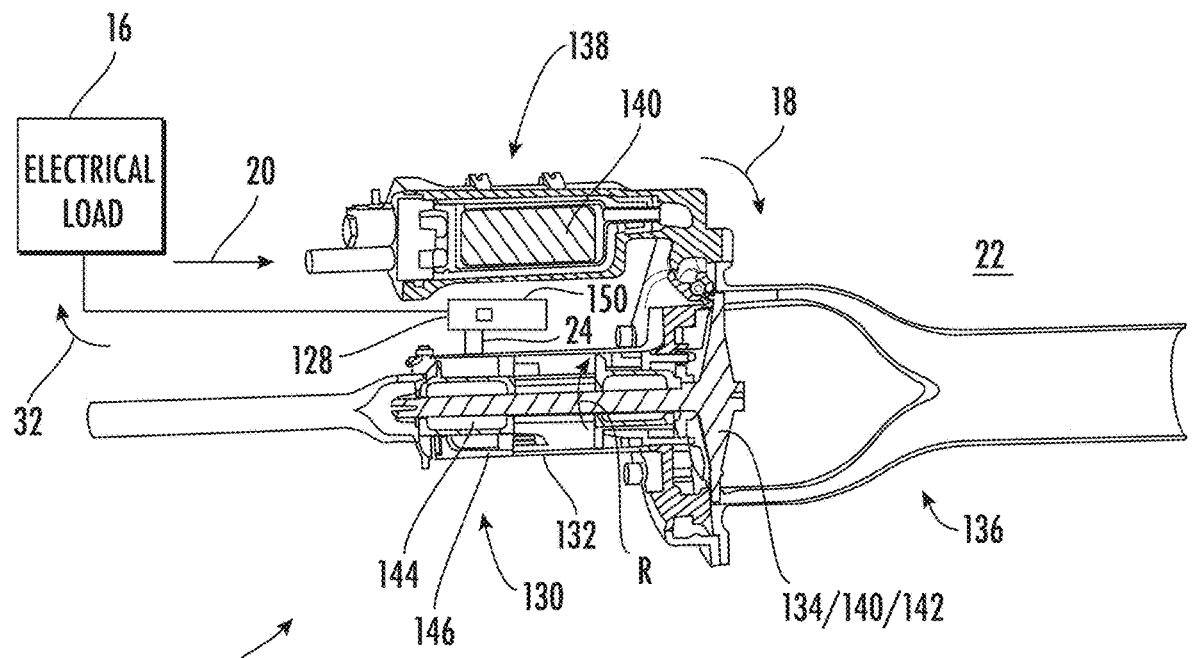
FIG. 2 is a longitudinal cross-sectional view of the turboalternator of FIG. 1, showing a turbine operatively connected to a permanent magnet generator and in fluid communication with the distributed energy system through a gas generator to generate electrical power.

With reference to FIG. 2, the turboalternator 102 is shown. The turboalternator 102 is configured and adapted to convert chemical energy from the chemical energy source 105 (shown in FIG. 3) contained in one or more of the fuel pressure vessels 106 (shown in FIG. 1) into mechanical energy, and therefrom electrical energy for powering an electrical load 16. In this respect the turboalternator 102 includes a power converter 128, a permanent magnet generator 130, and an interconnect shaft 132. The turboalternator 102 also includes a turbine 134, a diffuser 136, and a gas generator 138.

The gas generator 138 fluidly connects the energy storage system 100 with the turbine 134, includes a decomposition or combustion chamber 140, and is configured and adapted to generate a flow of high pressure combustion products 18 from a fuel flow 20 provided to the decomposition or combustion chamber 140 by the energy storage system 100. The high pressure combustion products 18 are communicated to the turbine 134. As shown in FIG. 2 a monopropellant is provided to a decomposition chamber and decomposed therein without utilization of an oxidizer to generate high pressure decomposition products. In certain embodiments a liquid fuel and an oxidizer, e.g., compressed air, can be provided to a combustion chamber and combusted therein to generate high pressure combustion products.

The turbine 134 fluidly connects the gas generator 138 with the ambient environment 22 and is operably connected to the permanent magnet generator 130 by the interconnect shaft 132. In this respect the turbine 134 receives the high pressure combustion products 18, expands the high pressure combustion products 18 as the high pressure combustion products 18 traverse the turbine 134, extracts work from the high pressure combustion products 18 as they traverse the turbine 134, and communicate the work to the permanent magnet generator 130 as mechanical rotation R through the interconnect shaft 132. Once expanded, the high pressure combustion products 18 are communicated to the ambient environment 22 through the diffuser 136. The diffuser 136 converts the remaining dynamic energy of the turbine exhaust into static pressure, which increases the available pressure ratio across the turbine 134 and turbine nozzles. In certain embodiments the turbine 134 includes an impulse turbine 140, providing radial compactness to the turbine 134. In accordance with certain embodiments the turbine 134 can include a single stage 142, providing axial compactness to the turbine 134.

The permanent magnet generator 130 is operatively associated with the turbine 134, is electrically connected to the power converter 128, and is configured and adapted to generate variable frequency alternating current (AC) power 24 using the mechanical rotation R provided to the permanent magnet generator 130 by the turbine 134 through the interconnect shaft 132. In this respect the permanent magnet generator 130 includes one or more permanent magnets 144, fixed in rotation relative to the interconnect shaft 132, and supported for rotation relative to a stator winding 146. The permanent magnet 144 generates magnetic flux, which is communicated to the stator winding 146 during rotation and which induces a flow of alternating current in the stator winding 146.

The power converter 128 electrically connects the stator winding 146 with the electrical load 16 and is configured and adapted to convert the variable frequency AC power 24 provided by the permanent magnet generator 130 into direct current (DC) power 32. Conversion is accomplished by a rectifier circuit 148, which in certain embodiments is a rectifier circuit 150. In certain embodiments the rectifier circuit 150 includes a diode bridge, which passively rectifies the variable frequency AC power 24 into DC power 32 with a relatively simple circuit arrangement.

Figure 3:
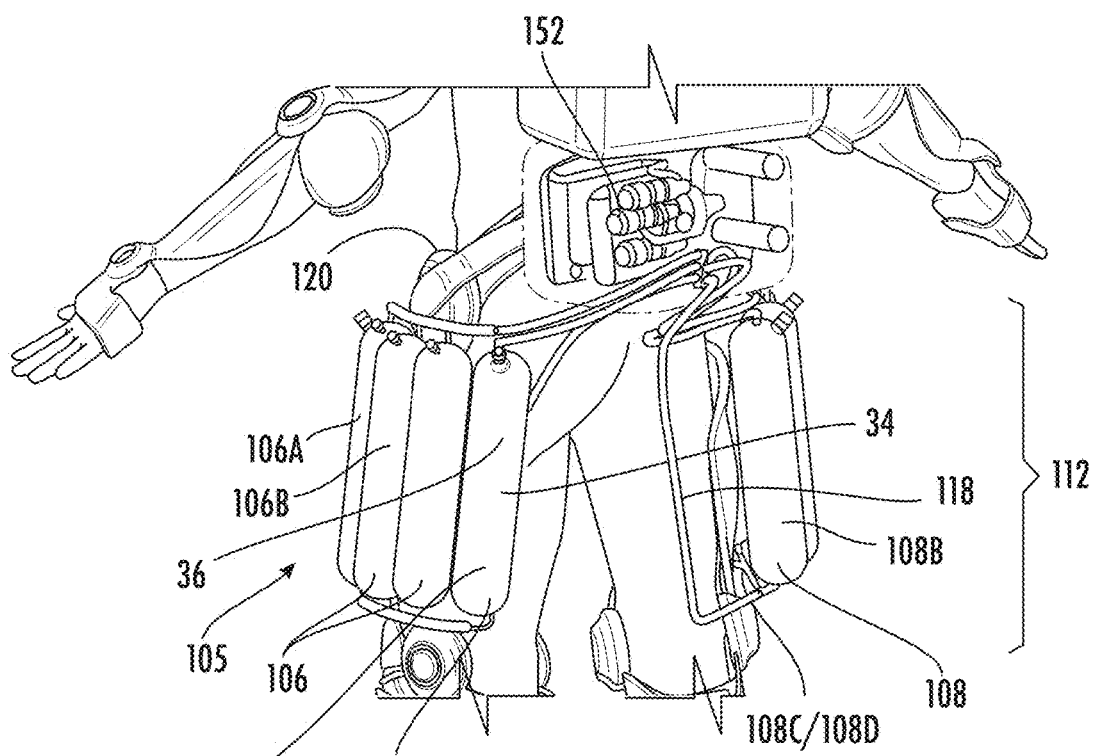
FIG. 3 is a perspective view of the distributed energy system of FIG. 1, showing a chemical energy source including fuel pressure vessels and compressed gas pressure vessels distributed and supported on a right-leg portion and a left-leg portion of the limb segment of the harness.

With reference to FIG. 3, a portion of the energy storage system 100 is shown. The energy storage system includes the fuel pressure vessels 106 and the compressed gas pressure vessels 108. A first compressed gas pressure vessel 108A, a first fuel pressure vessel 106A, and one or more second fuel pressure vessels 106B are supported by the right-leg portion 118 of the limb segment 112 of the harness 104. The first compressed gas pressure vessel 108A contains a compressed gas charge 34. In certain embodiments the compressed gas charge 34 includes an inert gas, such as substantially pure nitrogen by way of non-limiting example. The first fuel pressure vessel 106A and the one or more second fuel pressure vessels 106B respectively contain a fuel charge 36. In certain embodiment the fuel charge 36 is a liquid fuel charge, such as a kerosene-based liquid fuel like JP-8 in conjunction with an oxidizer in a combustion chamber by way of non-limiting example.

The first fuel pressure vessel 106A and the one or more second fuel pressure vessels 106B are in fluid communication with the turboalternator 102. More specifically, the first fuel pressure vessel 106A is connected to the turboalternator 102 in parallel with the one or more second fuel pressure vessels 106B. In this respect a throttle valve 152 fluidly connects the first fuel pressure vessel 106A and the one or more second fuel pressure vessels 106B to the turboalternator 102, the throttle valve 152 controlling the speed of the turbine 134 by throttling the rate of the flow of the fuel charge 36 to the turbine 134. It is contemplated that the compressed gas charge 34 from the compressed gas pressure vessel 108 drive fuel from the liquid fuel charge 36 to the turboalternator 102. In certain embodiments the energy storage system 100 provides a liquid fuel 38 to the turboalternator 102.

The first compressed gas pressure vessel 108A is fluidly coupled to the turboalternator 102 by the first fuel pressure vessel 106A and the one or more second fuel pressure vessels 106B, respectively, in a blowdown arrangement. In this respect the first compressed gas pressure vessel 108A is fluidly connected to the first fuel pressure vessel 106A and the one or more second fuel pressure vessels 106B at the right-leg portion 118 to pressurize the fuel contained in both the first fuel pressure vessel 106A and the one or more second fuel pressure vessels 106B. As will be appreciated by those of skill in the art in view of the present disclosure, pressurizing the fuel charge 36 within the first fuel pressure vessel 106A and the one or more second fuel pressure vessels 106B using the compressed gas charge 34 within the first compressed gas pressure vessel 108A simplifies the control scheme for delivery of fuel to the turboalternator 102, the turbine speed control valve 152 employing a variable orifice structure in certain embodiments.

The second compressed gas pressure vessel 108B is similar to the first compressed gas pressure vessel 108A, and is additionally supported on the left-leg portion 120 of the limb segment 112 of the harness 104. Further, the second compressed gas pressure vessels 108B is connected to the turboalternator 102 through both a third fuel pressure vessels 108C and one or more fourth fuel pressure vessels 108D. As will be appreciated by those of skill in the art in view of the present disclosure, this distributes fuel contained in the energy storage system 100 both between the plurality of fuel pressure vessels 106 supported on the left-leg portion 120 and the right-leg portion 118 of the limb segment 112 of the harness 104.

Figure 4:
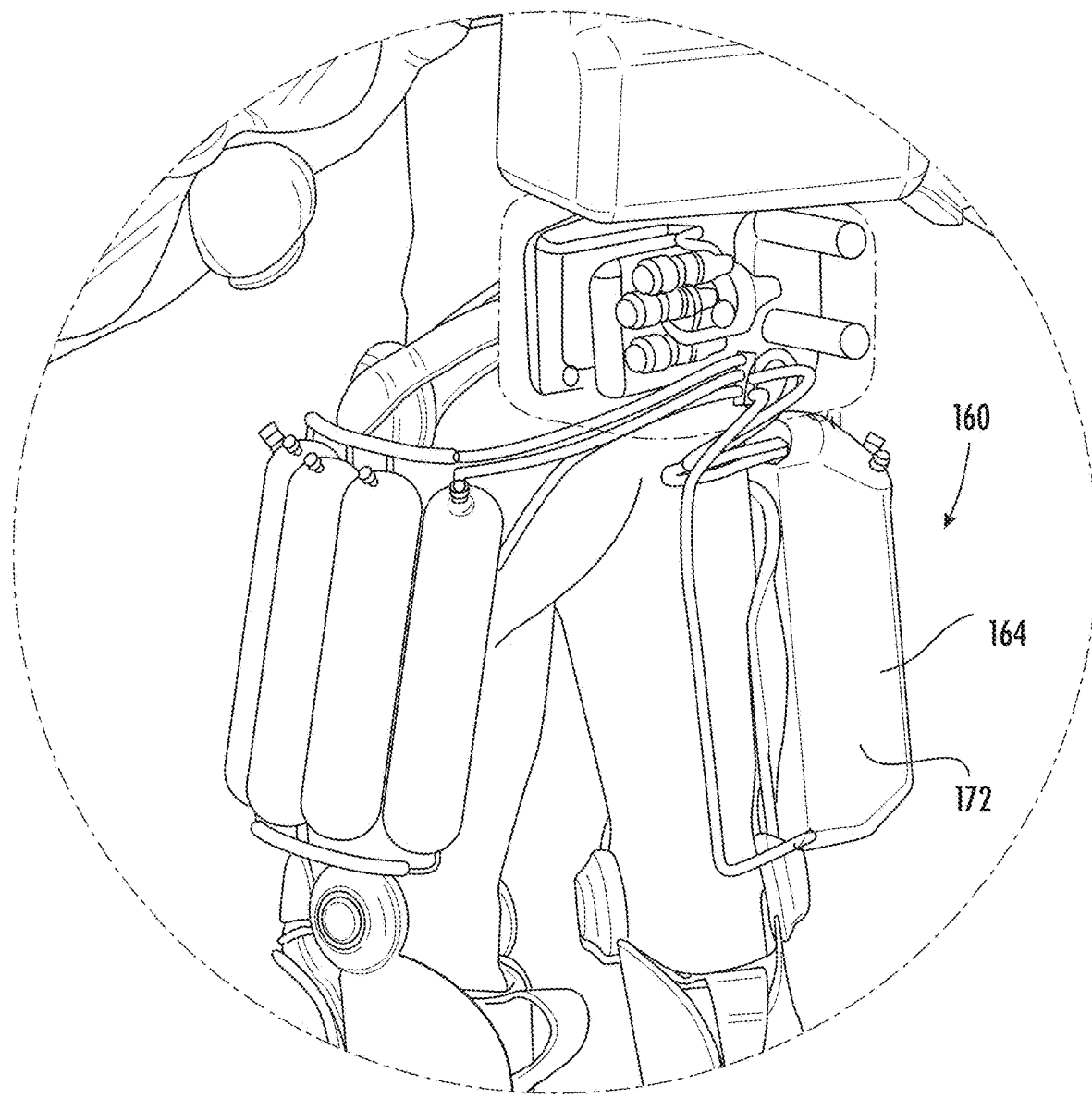
FIG. 4 is a perspective view of the distributed energy system of FIG. 1, showing a ballistic shield enclosing compressed gas and fuel storage pressure vessels of the chemical energy source on a left-leg portion of the harness.

With reference to FIG. 4, a ballistic shield arrangement 160 is shown. The ballistic shield arrangement 160 is configured an adapted to provide ballistic protection and includes a left-leg ballistic shield 162 (shown in FIG. 5) and a right-leg ballistic shield 164. The right-leg ballistic shield 164 includes a fiber reinforced ceramic material 172. The fiber reinforced ceramic material 172 is configured and adapted to fragment an incoming projectile upon impact. Examples of suitable fiber-reinforced ceramic materials include those described in U.S. Pat. No. 5,970,843 to Strasser et al., issued on Oct. 26, 1999, the contents of which are incorporated herein by reference in its entirety.

Figure 5:
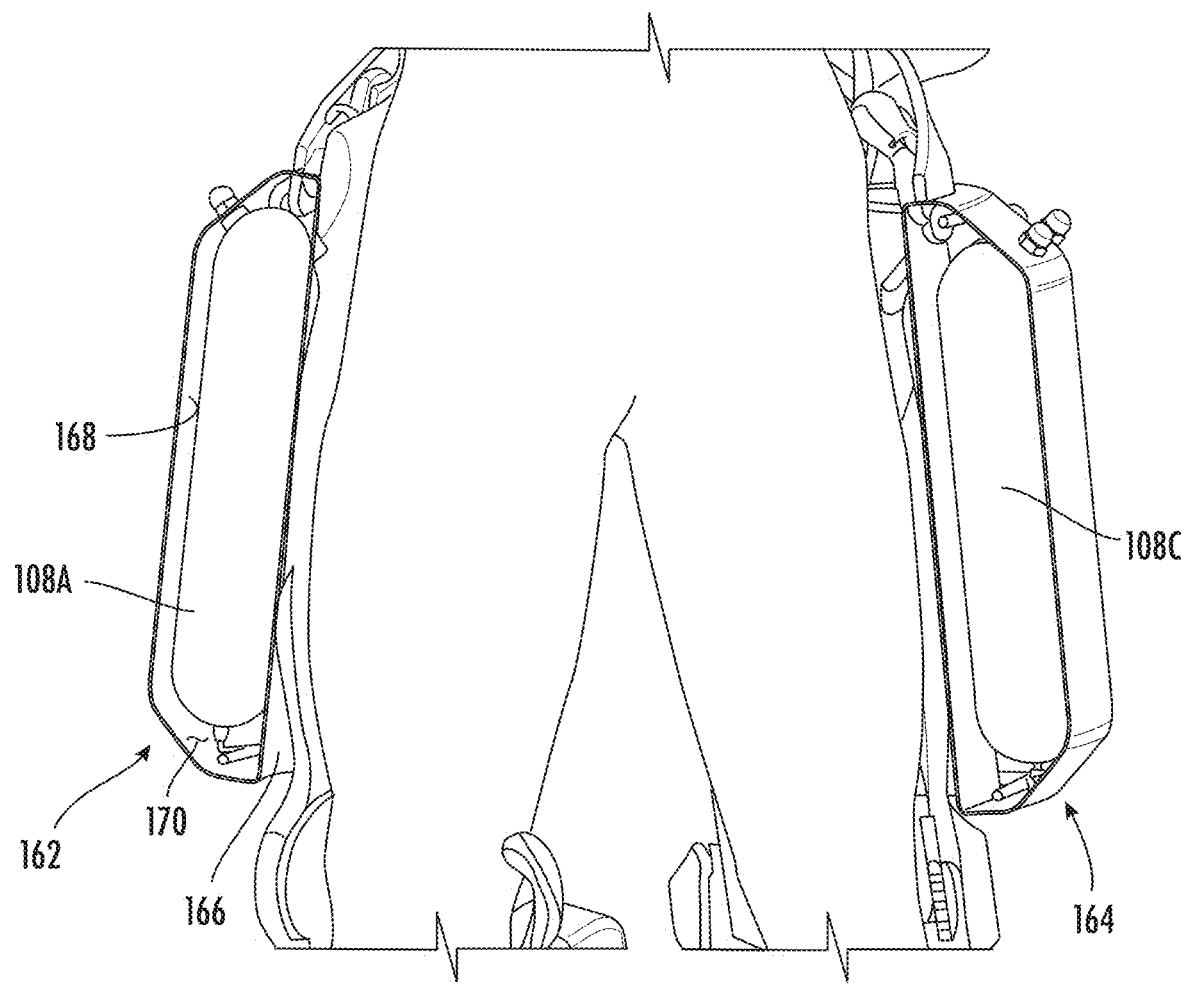
FIG. 5 is a partial cross-sectional view of the distributed energy system of FIG. 1, showing a shear thickening fluid disposed between an inner case and an outer case of the ballistic shield, the shear-thickening fluid enveloping pressure vessels of the chemical energy source.

With reference to FIG. 5, the left-leg ballistic shield 162 and the right-leg ballistic shield 164 are shown. The left-leg ballistic shield 162 includes an inner case 166, an outer case 168, and a shear thickening fluid 170. The inner case 166 is arranged between the first fuel pressure vessel 106A and the left-leg portion 120 of the harness 104. More specifically, the inner case 166 is arranged between each of the first fuel pressure vessel 106A, the one or more second fuel pressure vessels 106B (shown in FIG. 1), and the first compressed gas pressure vessel 108A (shown in FIG. 1).

The outer case 168 is arranged on a side of the first fuel pressure vessel 106A opposite the inner case 166. More specifically, the outer case 168 is arranged on a side of the first fuel pressure vessel 106A, the one or more second fuel pressure vessels 106B, and the first compressed gas pressure vessel 108A opposite the inner case 166. The shear thickening fluid 170 is disposed between the inner case 166 and the outer case 168. In this respect the shear thickening fluid 170 envelopes the first fuel pressure vessel 106A, the one or more second fuel pressure vessels 106B, and the first compressed gas pressure vessel 108A in a cavity defined between the outer case 168 and the inner case 166. Examples of suitable shear thickening fluids include ArmourGel®, available from the Dow Corning Company of Midland, Mich.

Figure 6:
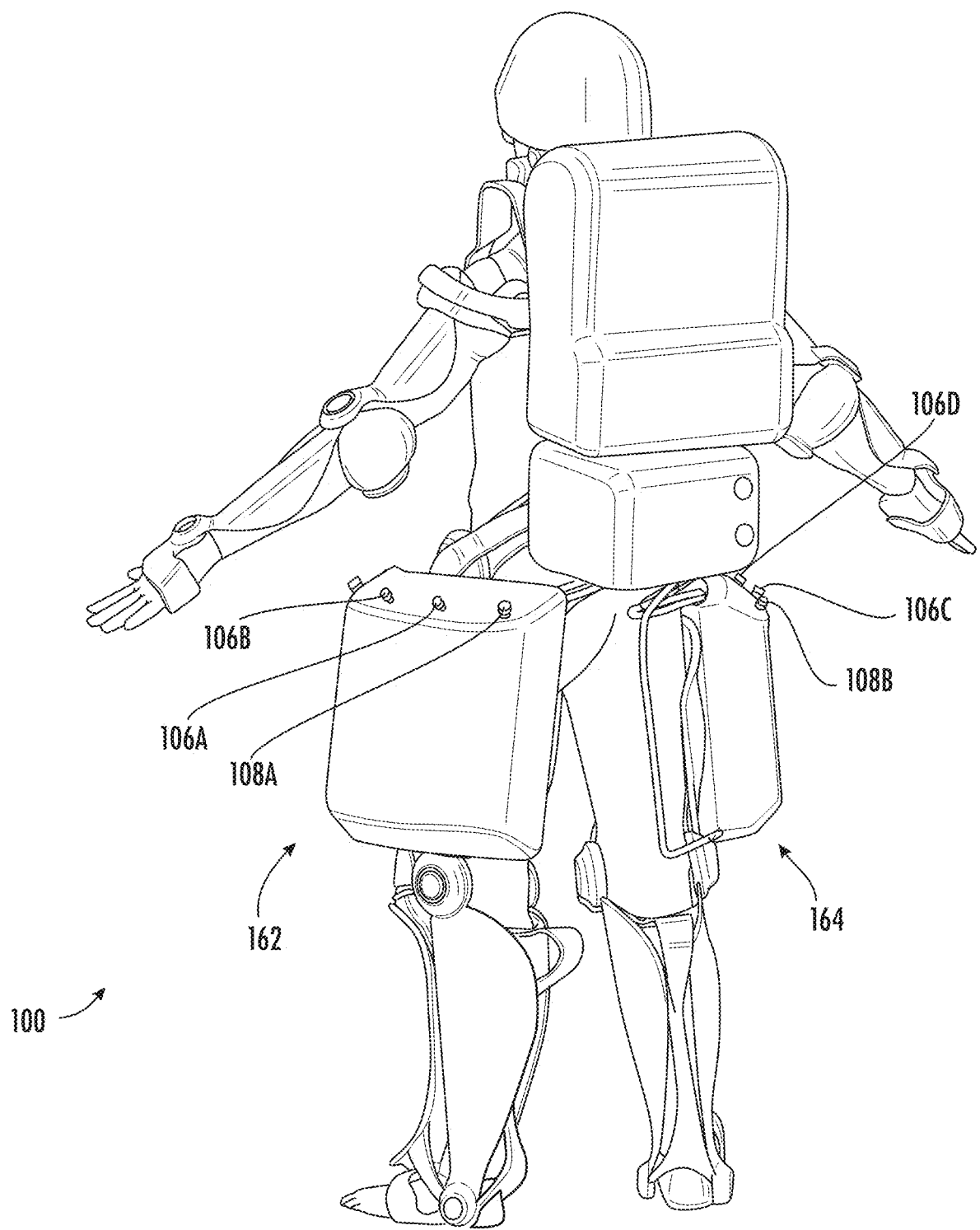
FIG. 6 is a perspective view of the distributed energy system of FIG. 1, showing a ballistic shield enclosing compressed gas and fuel storage pressure vessels of the chemical energy source and supported on the left-leg portion and the right-leg portion of the limb segment of the harness.

As shown in FIGS. 5 and 6, the left-leg ballistic shield 162 at least partially encloses the first fuel pressure vessel 106A, the one or more second fuel pressure vessels 106B, and the first compressed gas pressure vessel 108A. The right-leg ballistic shield 164 is similar to the left-leg ballistic shield 162, and additionally encloses the third pressure vessel 106C, the one or more fourth pressure vessels 106D, and the second compressed gas pressure vessel 108B.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An energy storage system for a wearable power module, comprising:
   a harness with a torso segment and a limb segment;
   a turboalternator supported by the torso segment of the harness; and
   a chemical energy source in fluid communication with the turboalternator and supported by the harness, wherein the chemical energy source is supported on the limb segment of the harness in a distributed arrangement to allow for support of a mechanical load by the torso segment of the harness.

2. The energy storage system as recited in claim 1, wherein the limb segment of the harness includes a left-leg portion and a right-leg portion, wherein the chemical energy source is distributed between the left-leg portion and right-leg portion of the limb segment.

3. The energy storage system as recited in claim 1, wherein the chemical energy source comprises a first pressure vessel and one or more second pressure vessels, the one or more second pressure vessels are in fluid communication with the turboalternator.

4. The energy storage system as recited in claim 3, wherein the first pressure vessel is fluidly connected to the turboalternator by the one or more second pressure vessels.

5. The energy storage system as recited in claim 3, wherein the first pressure vessel contains a compressed gas charge, wherein the one or more second pressure vessels contains a fuel charge.

6. The energy storage system as recited in claim 3, wherein the one or more second pressure vessels contain vessel contains a liquid fuel charge, wherein the liquid fuel charge is pressurized by a compressed gas communicated by the first pressure vessel.

7. The energy storage system as recited in claim 3, wherein the limb segment of the harness comprises a left-leg portion and right-leg portion, wherein the first pressure vessel is supported by one of the left-leg portion and the right-leg portion, wherein the one or more second pressure vessels are supported by the other of left-leg portion and the right-leg portion.

8. The energy storage system as recited in claim 1, further comprising a turbine speed control valve fluidly connecting the chemical energy source to the turboalternator.

9. The energy storage system as recited in claim 1, wherein the torso segment of the harness has a shoulder portion and a lower back portion, wherein the turboalternator is supported by the lower back portion of the torso segment, and further comprising a mechanical load supported by the lower back portion of the harness.

10. The energy storage system as recited in claim 1, further comprising an electrical load electrically connected to the turboalternator.

11. The energy storage system as recited in claim 1, further comprising a ballistic shield at least partially enclosing the chemical energy source.

12. The energy storage system as recited in claim 11, wherein the ballistic shield comprises an outer case, wherein the chemical energy source is arranged between the harness and the outer case of the ballistic shield.

13. The energy storage system as recited in claim 11, wherein the ballistic shield comprises an inner case, wherein the inner case is arranged between the chemical energy source and the harness.

14. The energy storage system as recited in in claim 11, wherein the ballistic shield comprises:
   an inner case arranged between the chemical energy source and the harness;
   an outer case arranged on a side of the chemical energy source opposite the inner case; and
   a shear thickening fluid disposed between the inner case and the outer case, the shear thickening fluid enveloping at least a portion of the chemical energy source.

15. The energy storage system as recited in claim 11, wherein the ballistic shield comprises a fiber reinforced ceramic material.

16. The energy storage system as recited in claim 11, wherein the chemical energy source comprises a first pressure vessel and one or more second pressure vessel, wherein the ballistic shield encloses the first pressure vessel and the one or more second pressure vessel.

17. The energy storage system as recited in claim 1, wherein the turboalternator comprises:
   a power converter;
   a permanent magnet generator electrically connected to the power converter;
   a turbine operatively connected to the permanent magnet generator;
   a gas generator in fluid communication with the turbine; and
   a turbine speed control valve fluidly connecting the chemical energy source to the gas generator.

18. A wearable power module, comprising:
   an energy storage system as recited in claim 1, wherein the chemical energy source comprises a first pressure vessel and one or more second pressure vessels, the one or more second pressure vessels in fluid communication with the turboalternator;
   wherein the limb segment of the harness includes a left-leg portion and a right-leg portion, wherein the first pressure vessel and the one or more second pressure vessels are distributed between the left-leg portion and right-leg portion of the limb segment; and
   a ballistic shield at least partially enclosing the first pressure vessel and the one or more second pressure vessels.

19. The wearable power module as recited in claim 18, wherein the torso segment of the harness has a shoulder portion and a lower back portion, wherein the turboalternator is supported by the lower back portion of the torso segment, and further comprising:
   a mechanical load including a cargo pack supported by the lower back portion of the harness; and
   an electrical load electrically connected to the turboalternator.

20. An exoskeleton, comprising:
   at least one of a load-carrying member and load-transfer member; and
   an energy storage system as recited in claim 1, wherein the chemical energy source is supported by the exoskeleton through the harness of the energy storage system.

* * * * *